US 6,424,061 B1

(12) United States Patent
Fukuda et al.

(10) Patent No.: US 6,424,061 B1
(45) Date of Patent: Jul. 23, 2002

(54) STEPPING MOTOR WITH MAGNETIC SENSOR

(75) Inventors: Yoshiaki Fukuda, Hyogo; Yutaka Kamogi; Yukio Nakamura, both of Tottori, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/661,925

(22) Filed: Sep. 14, 2000

(30) Foreign Application Priority Data

Sep. 14, 1999 (JP) ............................. 11-260115

(51) Int. Cl.[7] ................. H02K 37/14; H02K 11/00; H02K 5/18
(52) U.S. Cl. ............. 310/49 R; 310/68 B; 310/DIG. 6; 310/89
(58) Field of Search ...................... 370/49 R, 68 B, 370/67 R, 64, DIG. 6, 49 A, 257, 89, 68 R

(56) References Cited

U.S. PATENT DOCUMENTS

| | | | | |
|---|---|---|---|---|
| 3,809,935 A | * | 5/1974 | Kristen et al. | 310/68 |
| 4,988,905 A | * | 1/1991 | Tolmie, Jr. | 310/68 B |
| 5,049,769 A | * | 9/1991 | Reinhardt et al. | 310/64 |
| 5,770,900 A | * | 6/1998 | Sato et al. | 310/49 R |
| 5,932,942 A | * | 8/1999 | Patyk et al. | 310/58 |
| 5,969,445 A | * | 10/1999 | Horiuchi et al. | 310/64 |

FOREIGN PATENT DOCUMENTS

| | | |
|---|---|---|
| JP | 62-135558 | 8/1987 |
| JP | 09253139 | 9/1997 |

* cited by examiner

Primary Examiner—Nicholas Ponomarenko
Assistant Examiner—Dang Dinh Le
(74) Attorney, Agent, or Firm—Ratner & Prestia

(57) ABSTRACT

A stepping motor includes (a) a rotor being driven by exciting a driving coil, (b) a position detector including a magnetic flux generator for outputting a signal in the same phase as a polarity position of a magnet mounted to the rotor and a magnetic sensor receiving magnetic force from the magnetic flux generator, (c) a controller for controlling the stepping motor responsive to a position detection signal supplied from the position detector, (d) a board on which the magnetic sensor and the controller are mounted, and (e) a sensor cover for positioning the magnetic sensor, dissipating heat of the controller and for covering at least a part of the position detector and the controller. This structure allows the controller and the magnetic sensor to avoid the heat generated by the stepping motor. This structure also allows to assemble a motor sub-assembly including the driving coil, the rotor and the magnetic flux generator independently of and separately from a sensor sub-assembly including the board and the sensor cover. Thus the productivity increases and material loss decreases.

6 Claims, 7 Drawing Sheets

STEPPING MOTOR WITH MAGNETIC SENSOR

FIELD OF THE INVENTION

The present invention relates to a stepping motor with a magnetic sensor—this stepping motor is widely used in information devices and the like—and more particularly, it relates to a mounting mechanism of the sensor.

BACKGROUND OF THE INVENTION

Recently, stepping motors are extensively used in various fields, such as information devices and audio equipment including, a printer, facsimile, image scanner, copying machine, laser beam printer, CD-ROM, DVC. Other fields including factory automation (FA) equipment such as machine tools, automotive components, and a field of home appliances also employs a large number of stepping motors. This extensive use of the stepper motors is mainly thanks to a low cost, and simple operation realizing a speed control or a positioning control.

Nowadays, a stepping motor coming with a sensor is widely available in order to improve the performance thereof.

A sensor mounting mechanism to the stepping motor is disclosed by the Japanese Patent Application Non-Examined Publication No. H09-253139 and Japanese Utility Model Application Non-Examined Publication No. S62-135558.

FIG. 10 and FIG. 11 illustrate the construction of conventional stepping motors coming with a sensor.

FIG. 10 is a cross section illustrating a structure of a conventional stepping motor with a magnetic sensor.

In FIG. 10, driving coil 51 of the stepping motor is covered by yoke 52, which is a comb-teeth-like pair of magnetic substance. Rotor 53 is disposed to face the inner wall of yoke 52 with a given space. Rotor 53 comprises output shaft 54, magnet 55 which is magnetized to N and S polarities in pairs, and a resin-made coupler for coupling shaft 54 with magnet 55. Magnetic sensor 56 is soldered to printed circuit board 57 attached independently to the stepping motor. With a given space, sensor 56 faces to a face-to-face type magnetic drum 58 mounted to shaft 54 and having pairs of polarities. The revolving of rotor 53 rotates drum 58. At this time, a voltage corresponding to the magnetic force of the pairs of N and S polarities of drum 58 is tapped off from sensor 56 through a circuit printed on board 57. Sensor 56 and drum 58 are, in general, protected by sensor cover 59 mechanically as well as electrically.

FIG. 11 is a cross section illustrating a structure of a conventional stepping motor with a photo sensor.

In FIG. 11, slit-disc 73 having a plurality of fine slits is disposed on output shaft 72 of rotor 71. Photo sensor 74 either one of transparent or reflective type detects the slits on disc 73, and outputs signals corresponding to the sensed result cyclically. Sensor 74 and disc 73 are, in general, protected by sensor cover 75 electrically and mechanically.

This sensor is generally called optical encoder, and used in various fields. The sensor features (a) easy mounting, (b) a large output signal, and (c) versatile output signals available depending on a slit-type on the slit-disc. However, it is difficult to adjust positioning between the slit-disc and rotor for obtaining an output signal from the sensor corresponding to the rotor. The sensor thus tends to produce dispersion in performance, and the optical encoder is generally expensive.

As such, the conventional sensor has both advantages and disadvantages in mounting thereof, a magnitude of an output, position adjustment, a resolution and a cost.

Both in FIG. 10 and FIG. 11, functions of sensing rotation of the output shaft are the same; however, in FIG. 10, a magnetic sensor may directly detects a polarity position of the magnet fixed to the rotor. Since the magnetic drum uses magnets, the magnet polarities of magnetic drum and those of rotor can be aligned depending on a way of magnetizing.

On the other hand, in FIG. 11, the slit-disc and the magnet polarities should be aligned at an independent process. Adjustable range of dimensions (or angle) decreases at a higher sensing resolution of the slit-disc, therefore, this alignment is substantially difficult, and adversely affects the cost and stableness in performance.

A problem common to these two instances is great influence of heat to the sensor because the stepping motor generates large amount of heat by itself. When a motor is controlled, a sensor signal should be stable, and influence by heat to the circuits around and a control IC should be also considered. In a conventional structure, only the sensor has been placed at a remote spot from the motor; however, this is not enough for the heat problem. When a sensing function and controlling function of the sensor are to be attached to a stepping motor or other motors generating great amount of heat by themselves, the sensor block should be positively kept away from the motor in order to avoid the heat influence to the sensor and the controlling IC. This structure needs compactness and efficiency in assembling as well.

In the conventional stepping motor having a general-use sensor as discussed above, it is difficult to keep a given space between the magnet and sensor and decrease heat influence to the sensor as well as to the control IC.

SUMMARY OF THE INVENTION

The present invention addresses the problems discussed above and aims to provide a new mounting mechanism of a sensor for improving a positioning accuracy of the sensor mounting position as well as decreasing influence by heat generated by a stepping motor to the sensor and a controller.

The stepping motor of the present invention comprises the following elements:

(a) a rotor driven by exciting a driving coil;

(b) a position detector including a magnetic flux generator for outputting a signal in the same phase as a polarity position of a magnet mounted to the rotor and a magnetic sensor receiving magnetic force from the magnetic flux generator;

(c) a controller for controlling a stepping motor responsive to a position detection signal from the position detector;

(d) a board on which the magnetic sensor and the controller are mounted; and (e) a sensor cover for positioning the magnetic sensor, dissipating heat from the controller and covering at least parts of the position detector as well as the controller.

The stepping motor can be divided into two independent sub-assemblies, i.e. a motor sub-assembly including the driving coil, rotor, magnetic flux generator, and a sensor sub-assembly including the board and sensor cover.

This structure decreases degradation such as lowering an output to the sensor or the controller due to the heat generated by the stepping motor, and allows an assembly process to be divided into the sensor sub-assembly and the motor sub-assembly. As a result, the present invention contributes to improving the productivity as well as lowering material loss.

DETAILED DESCRIPTION OF THE EXEMPLARY EMBODIMENTS

Exemplary embodiments of the present invention are demonstrated hereinafter with reference to the accompanying drawings.

(First Exemplary Embodiment)

Figure 1:
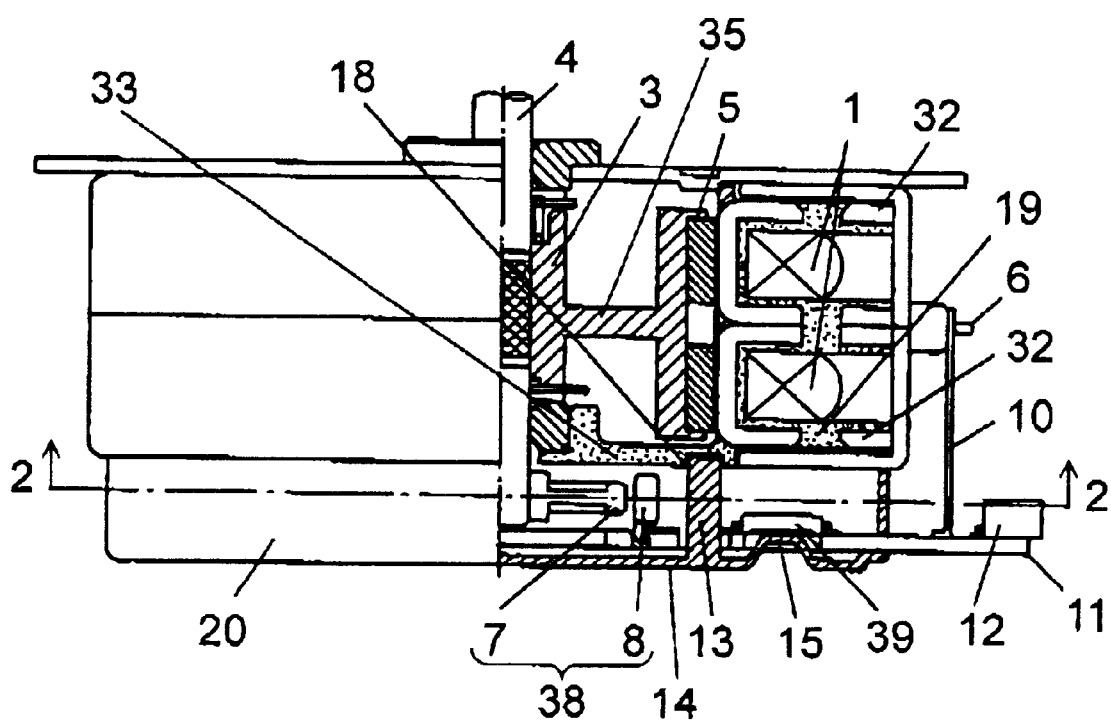
FIG. 1 is a cross section illustrating a structure of a stepping motor in accordance with a first exemplary embodiment of the present invention.
Figure 2:
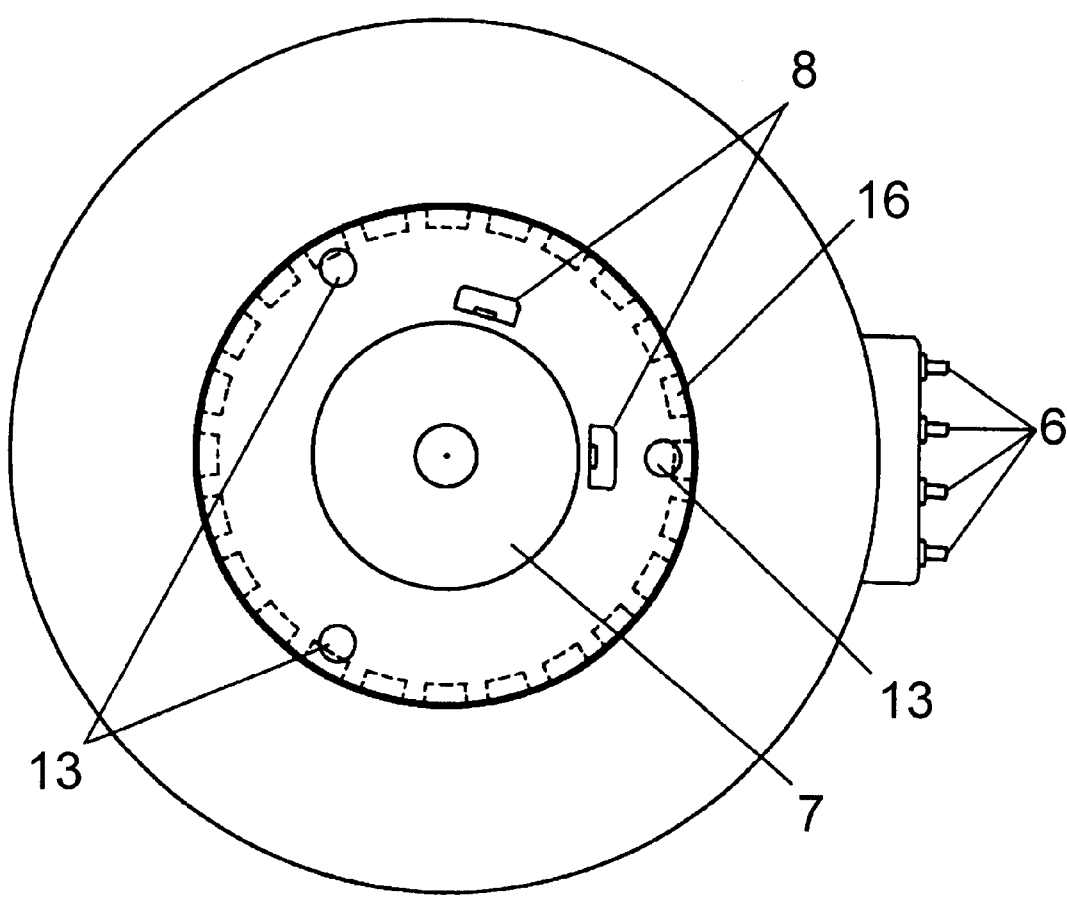
FIG. 2 is a cross section taken on lines 2—2 of FIG. 1 for illustrating positioning of a magnetic sensor shown in FIG. 1.
Figure 3:
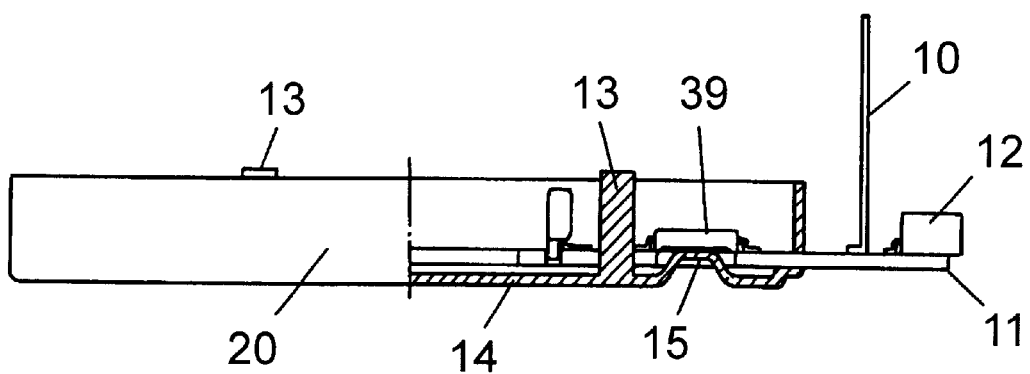
FIG. 3 is a cross section illustrating a structure of a sensor sub-assembly.

FIG. 1 is a cross section illustrating a structure of a stepping motor in accordance with the first exemplary embodiment of the present invention. FIG. 2 is a cross section taken on lines 2—2 of FIG. 1. FIG. 3 is a cross section illustrating a structure of a sensor sub-assembly.

In FIGS. 1 and 2, driving coils 1 of the stepping motor (hereinafter referred to as "motor") are covered by yoke 32—a pair of magnetic substance forming comb teeth. Respective pieces of yoke 32 are bonded by yoke coupler 19 made of e.g. resin. Rotor 3 faces to inner face of yoke 32 with a given space. Rotor 3 comprises output shaft 4, ring-shaped magnet 5 magnetized to N and S polarities in pairs, and coupler 35 made of resin for coupling shaft 4 with magnet 5.

Motor terminal 6 is coupled to printed circuit board 11 via connector 10, and the driving coils are powered through motor terminal 6. Magnetic drum 7—a magnetic flux generator—is mounted to a first end of shaft 4. Drum 7 is structured such that it outputs a positional signal of the same phase as the polarity position of magnet 5 mounted to rotor 3. Magnetic sensor 8 is mounted to board 11 with a given space between drum 7. This structure allows sensor 8 to receive the magnetic force generated by drum 7, i.e. a positional signal of rotor 3, then sensor 8 converts the magnetic signal into an electric signal. As such, a combination of drum 7 and sensor 8 makes up position detector 38.

An output from detector 38, i.e. a position detection signal, travels directly to connector 12 or via motor controlling IC 39—a controller—and a printed wiring of board 11. Connector 12 functions as an input/output terminal to/from motor terminal 6, sensor 8, controlling IC 39 and other circuits on board 11.

In this way, sensor 8, controlling IC 39 and other components are kept away from a motor block in order to avoid being influenced by heat generated by the motor. Sensor 8, controlling IC 39 and parts of board 11 are covered by sensor cover 14. Further, heat sink 15 is formed on a part of cover 14 so that heat sink 15 can touch controlling IC 39, thereby dissipating the heat generated from IC 39 by itself.

In this first embodiment, cover 14 positions board 11, to which sensor 8 is fixed. In FIG. 2, sensor 8 is positioned with reference to magnetic drum 7 of the motor block in the following manner: Engaging section 13 formed of a protrusion (or a recess) provided on cover 14 engages with another engaging section 18 formed of a recess (or a protrusion) provided on yoke coupler 33, where the position of yoke coupler 33 is referenced to a piece 16 of yoke 32. The positions of those engaging sections determine the relation between an output signal from sensor 8 and torque generated by the motor. In other words, positional relation between the yoke piece 16 (position of comb teeth) and the fixed position of sensor 8 determines the relation between an output signal from sensor 8 and torque generated by the motor.

Sensor sub-assembly 20 shown in FIG. 3 is an independent sub-assembly of the motor section and receives a position detection signal from sensor 8 as well as governs the motor control. This structure allows the motor sub-assembly and sensor sub-assembly to be assembled independently. As a result, material loss is substantially reduced and also the two sub-assemblies can be separately handled.

(Second Exemplary Embodiment)

Figure 4:
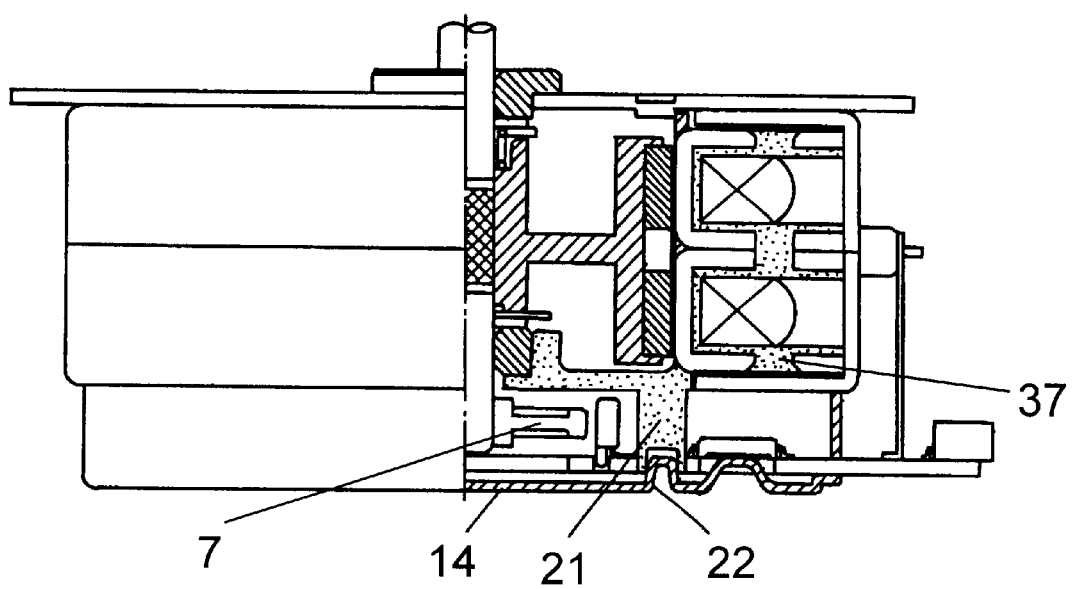
FIG. 4 is a cross section illustrating a structure of a stepping motor in accordance with a second exemplary embodiment of the present invention.

FIG. 4 is a cross section illustrating a structure of a stepping motor in accordance with the second exemplary embodiment of the present invention.

In the second embodiment, protrusion 22 formed on sensor cover 14 engages with a recess of the tip of positioning pin 21 disposed on yoke coupler 37 made of resin.

As such when pin 21 extends to lower than magnetic drum 7 mounted to the output shaft of motor, pin 21 functions as a mechanical protector for drum 7.

(Third Exemplary Embodiment)

Figure 5:
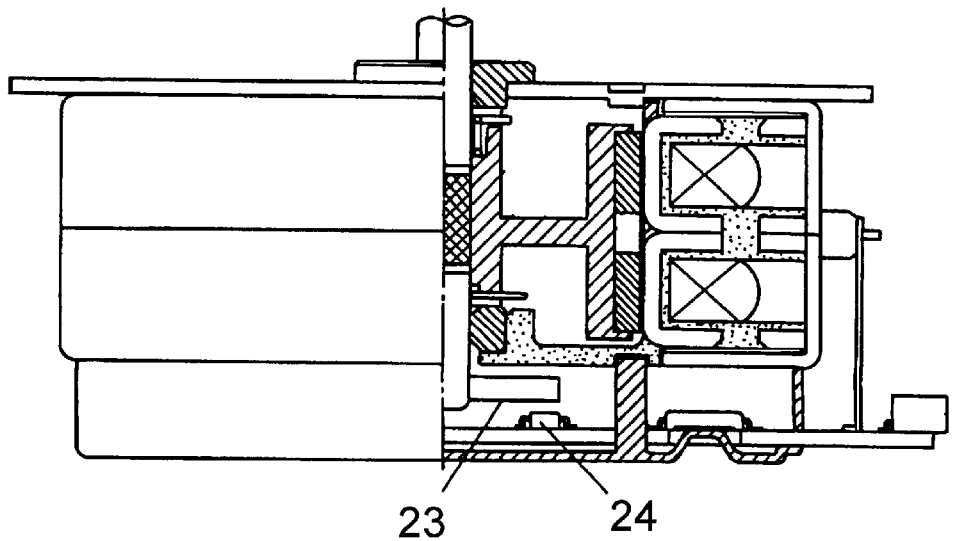
FIG. 5 is a cross section illustrating a structure of a stepping motor in accordance with a third exemplary embodiment of the present invention.

FIG. 5 is a cross section illustrating a structure of a stepping motor in accordance with the third exemplary embodiment of the present invention.

In the third embodiment, a face-to-face type magnetic sensor 24 is disposed to face a face-to-face type magnetic drum 23. Other structures are the same as that of the first embodiment. This structure allows drum 23 and sensor 24 to be slimmed. As a result, the motor as a whole can be slimmed down.

(Fourth Exemplary Embodiment)

Figure 6:
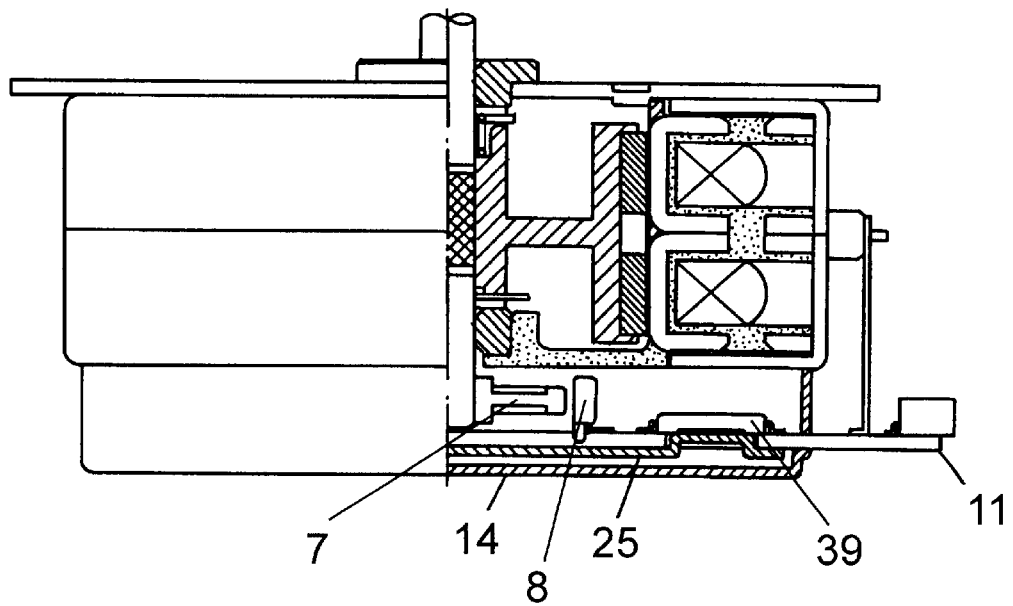
FIG. 6 is a cross section illustrating a structure of a stepping motor in accordance with a fourth exemplary embodiment of the present invention.

FIG. 6 is a cross section illustrating a structure of a stepping motor in accordance with the fourth exemplary embodiment of the present invention.

The fourth embodiment shows an example where heat-sink 25 is provided between sensor cover 14 and printed circuit board 11 on which magnetic sensor 8, controlling IC 39, and the like are mounted. The previous embodiments use the sensor cover as a heat dissipating medium in order to avoid the magnetic sensor or the controlling IC to be degraded due to the heat generated from the motor; however, heat dissipating material is limited to the material of the motor cover. Thus the previous embodiments are not applicable to a large output motor.

This fourth embodiment is thus best suited to such a large output motor. Heat sink 25 is made of a single material having a large heat radiating effect such as aluminum, and supported by board 11. Heat sink 25 is then adhered to controlling IC 39. This fourth embodiment also allows a sensor sub-assembly and a rotor sub-assembly to be separated.

(Fifth Exemplary Embodiment)

Figure 7:
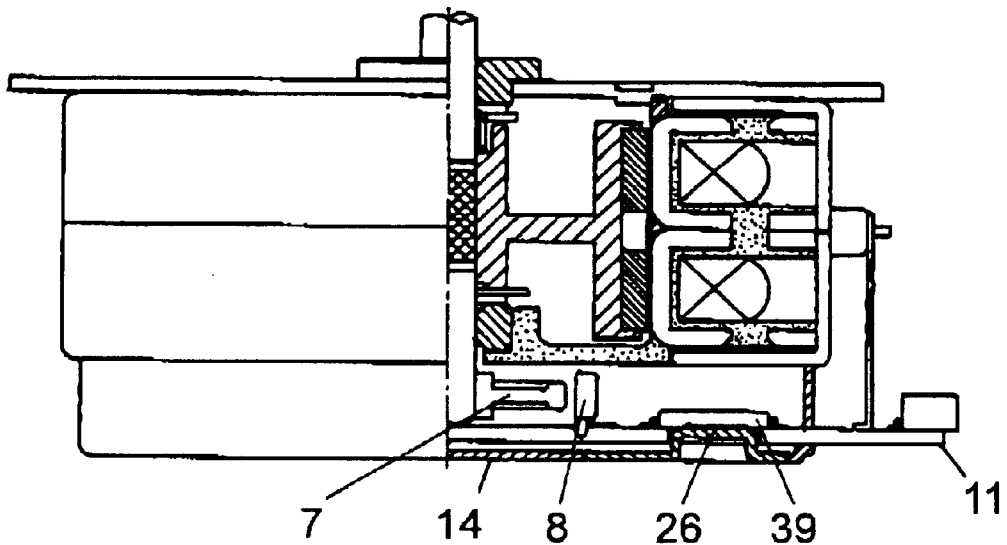
FIG. 7 is a cross section illustrating a structure of a stepping motor in accordance with a fifth exemplary embodiment of the present invention.

FIG. 7 is a cross section illustrating a structure of a stepping motor in accordance with the fifth exemplary embodiment of the present invention.

The fifth embodiment shows an example where heat sink 26 integrated into sensor cover 14 dissipates the heat from controlling IC 39 mounted to printed circuit board 11. Heat sink 26 made of material different from that of cover 14 and effecting more heat radiation can be used so that the heat from IC 39 can be more effectively dissipated.

(Sixth Exemplary Embodiment)

Figure 8:
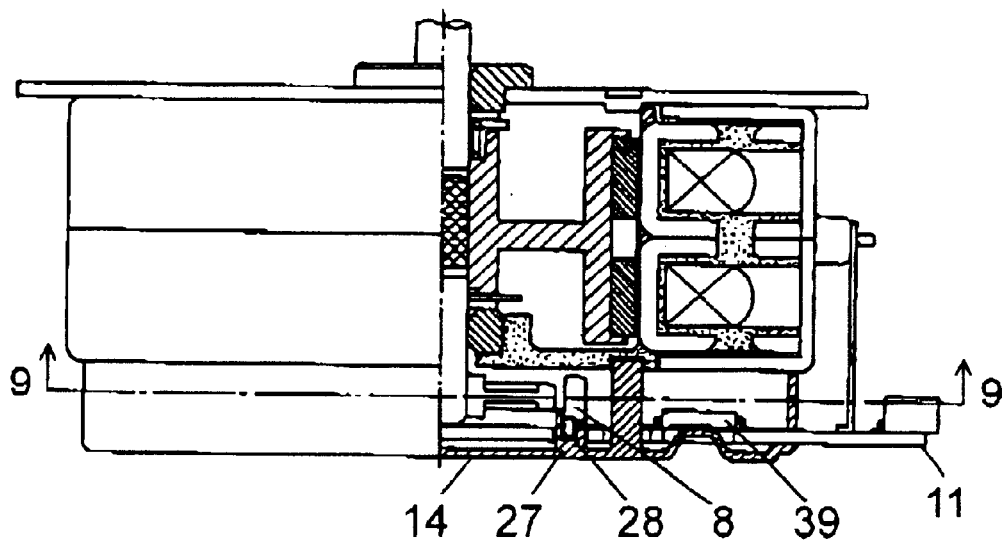
FIG. 8 is a cross section illustrating a structure of a stepping motor in accordance with a sixth exemplary embodiment of the present invention.
Figure 9:
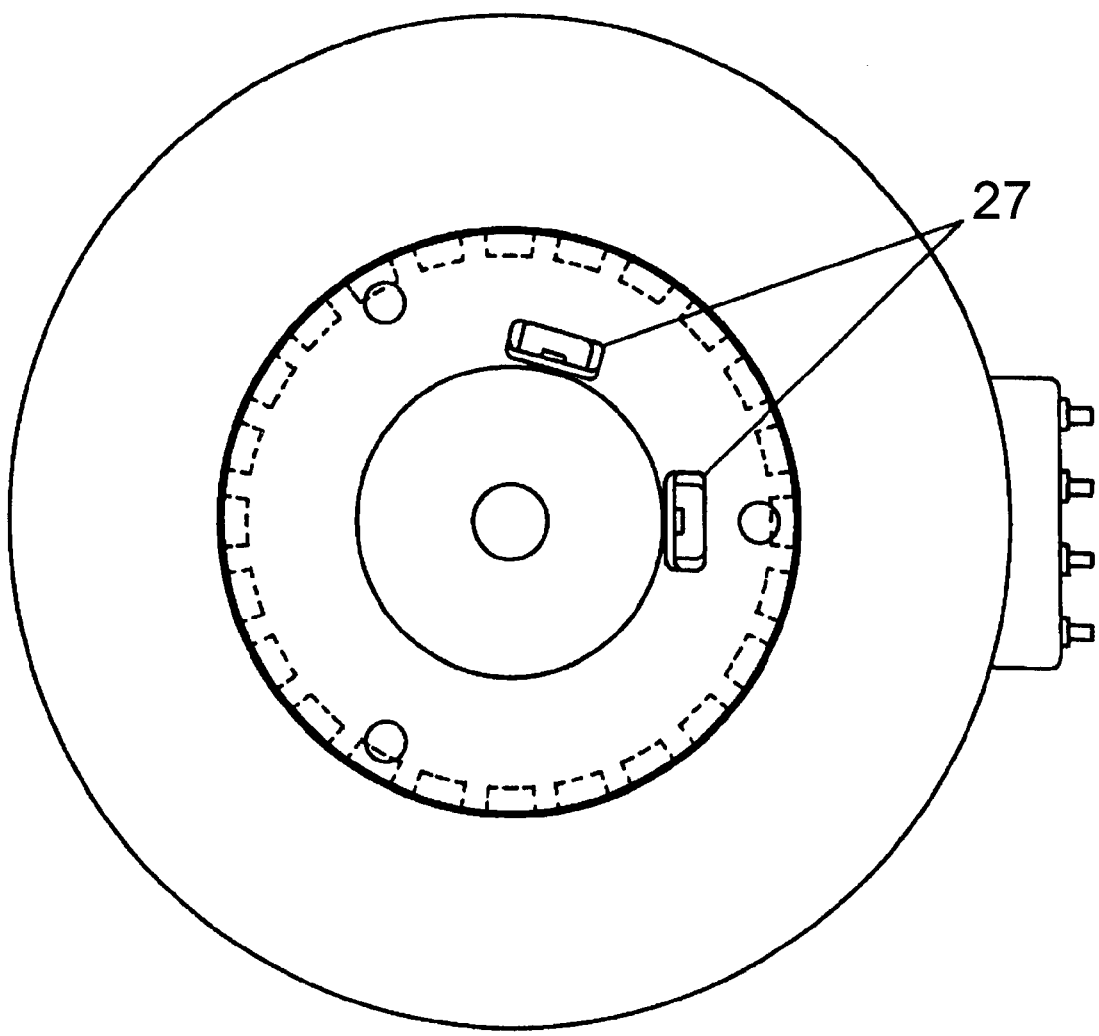
FIG. 9 is a cross section taken on lines 9—9 of FIG. 8 for illustrating positioning of a magnetic sensor shown in FIG. 8.
Figure 10:
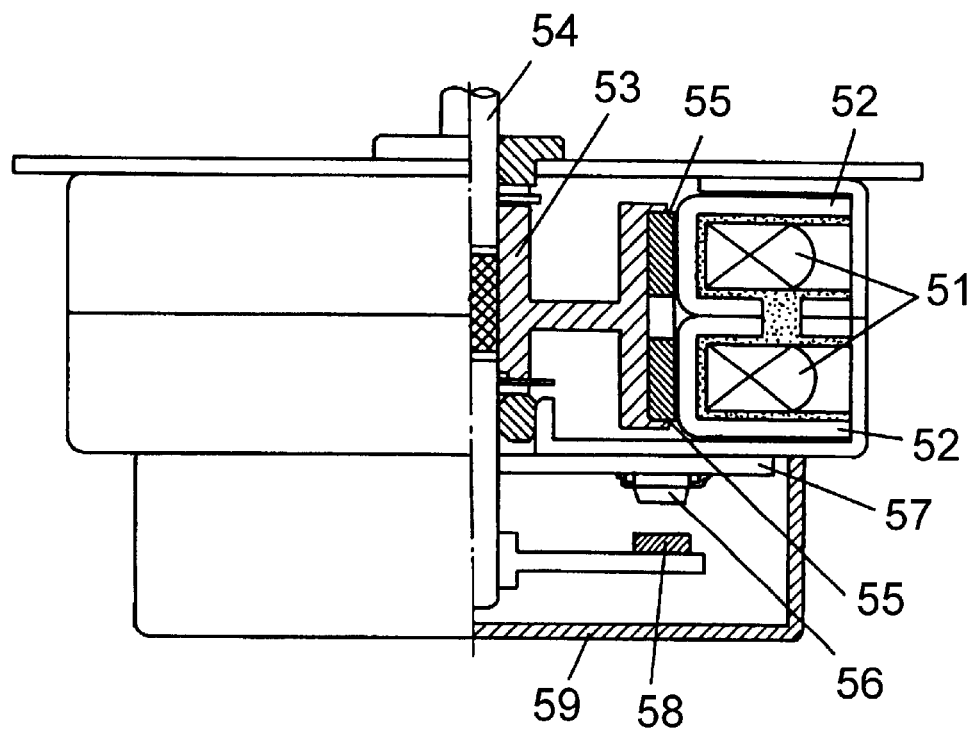
FIG. 10 is a cross section of a conventional stepping motor with a magnetic sensor.
Figure 11:
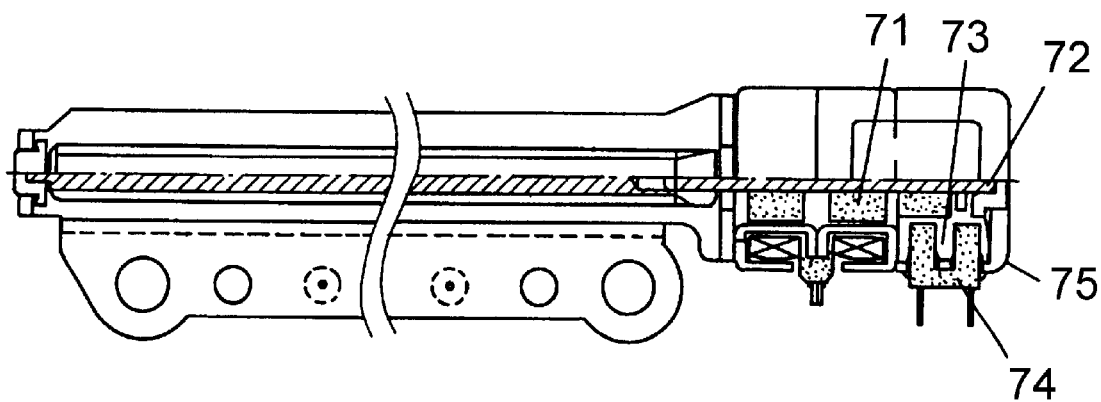
FIG. 11 is a cross section of a conventional stepping motor with a photo sensor.

FIG. 8 is a cross section illustrating a structure of a stepping motor in accordance with the sixth exemplary embodiment of the present invention, and FIG. 9 is a cross section taken on lines 9—9 of FIG. 8.

This sixth embodiment shows an example where positioning pin 27 for positioning magnetic sensor 8 and engaging section 28 with sensor 8 are provided on sensor cover 14. These pin 27 and engage section 28 are both unitarily integrated into cover, so that sensor 8 can be positioned without using a coupling medium such as printed circuit board 11. As a result, sensor 8 can be precisely positioned free from being affected by the degree of accuracy of board 11.

As discussed above, the present invention proves that a sensor assembly is independent of a motor assembly. The sensor assembly includes a board on which a magnetic sensor and a controller are mounted, and a sensor cover having a function of positioning the magnetic sensor as well as a function of dissipating heat from a controlling IC. This structure prevents the motor from degrading performances such as lowering outputs to the magnetic sensor or the controller with its heat, and also allows the sensor sub-assembly and motor sub-assembly to be assembled independently. As a result, the productivity increases and material loss decreases.

An engaging section formed on the sensor cover engages with another engaging section referenced to a yoke position of the motor so that the sensor can be positioned precisely. This contributes to stable control of the motor.

A heat sink is disposed between the board land the sensor cover, and at least parts of the heat sink touches to the controller, so that the sensor sub-assembly dealing with the motor of large output can be provided.

The heat sink can be integrated into parts of the sensor cover, whereby a compact sensor sub-assembly having a large effect of heat radiation can be provided.

A positioning section for the magnetic sensor can be unitarily molded with the sensor, cover, thereby forming a sensor mounting mechanism being positioned more precisely regardless of a degree of accuracy of the board.

As discussed above, the stepping motor with the magnetic sensor yields excellent advantages.

What is claimed is:

1. A stepping motor comprising:

(a) a rotor being driven by exciting a driving coil, and a magnet mounted to said rotor, said rotor and magnet in a motor sub-assembly including said driving coil;

(b) a position detector including a magnetic flux generator for outputting a signal of said rotor in the same phase as a polarity position of said magnet mounted to said rotor, and a magnetic sensor receiving a magnetic force from the magnetic flux generator;

(c) a controller for controlling said stepping motor responsive to a position detection signal supplied from said position detector;

(d) a board on which said magnetic sensor and said controller are mounted, said board spaced from said motor sub-assembly to avoid heat generated by said motor sub-assembly; and (e) a sensor cover for positioning said board with said magnetic sensor spaced from said motor sub-assembly, for dissipating heat of said controller, and for covering at least a part of said position detector and said controller.

2. The stepping motor as defined in claim 1, wherein said motor sub-assembly further includes said magnetic flux generator, and said stepping motor also comprises a sensor sub-assembly including said board and said sensor cover, both said sub-assemblies are independent from each other.

3. The stepping motor as defined in claim 2, wherein said motor sub-assembly includes a yoke covering said driving coil and a yoke coupler being coupled to the yoke, wherein an engaging section formed on the yoke coupler engages with another engaging section formed on said sensor cover.

4. The stepping motor as defined in claim 2, wherein said sensor sub-assembly further includes a heat sink disposed between said board and said sensor cover, wherein at least a part of the heat sink touches to said controller.

5. The stepping motor as defined in claim 1, wherein said sensor cover includes a heat sink section integrated therein, and at least a part of the heat sink section touches to said controller.

6. The stepping motor as defined in claim 1, wherein said sensor cover includes an engaging section unitarily integrated therein for the magnetic sensor, and the engaging section for the magnetic sensor engages with the magnetic sensor to position the sensor.

* * * * *